US012285880B2

(12) United States Patent
Finck

(10) Patent No.: US 12,285,880 B2
(45) Date of Patent: Apr. 29, 2025

(54) GLAZING PANEL REMOVAL

(71) Applicant: Belron International Limited, Egham (GB)

(72) Inventor: William Finck, Brentwood (GB)

(73) Assignee: Belron International Limited, Egham (GB)

( * ) Notice: Subject to any disclaimer, the term of this patent is extended or adjusted under 35 U.S.C. 154(b) by 0 days.

(21) Appl. No.: 18/526,258

(22) Filed: Dec. 1, 2023

(65) Prior Publication Data

US 2024/0109214 A1 Apr. 4, 2024

Related U.S. Application Data

(63) Continuation of application No. 17/505,551, filed on Oct. 19, 2021, now Pat. No. 11,872,715, which is a continuation of application No. 15/312,218, filed as application No. PCT/EP2015/061093 on May 20, 2015, now Pat. No. 11,161,267.

(30) Foreign Application Priority Data

May 20, 2014 (GB) ..................................... 1408938

(51) Int. Cl.
*B26D 1/547* (2006.01)
*B26D 5/08* (2006.01)

(52) U.S. Cl.
CPC ............... *B26D 1/547* (2013.01); *B26D 5/08* (2013.01)

(58) Field of Classification Search
CPC ......... B26D 5/08; B26D 1/547; B25B 11/007; B65H 54/00; B65H 51/00; B26B 27/002; B60J 1/02; Y10T 83/0524; Y10T 83/424; Y10T 83/667; Y10T 29/49721; Y10T 83/04; Y10T 83/896; Y10T 83/9292
USPC ....... 83/681, 651.1, 13, 56, 100, 200.1, 614, 83/743–745, 373; 30/116, 372, 317,
(Continued)

(56) References Cited

U.S. PATENT DOCUMENTS 3,583,541 A 6/1971 Okuda
3,955,443 A * 5/1976 Estrada .................. F16H 48/08 475/230

(Continued)

FOREIGN PATENT DOCUMENTS

AU 2015261909 B2 11/2015
AU 2019236620 B2 10/2019

(Continued)

OTHER PUBLICATIONS

EP Search Report dated Jan. 22, 2024 of Application No. EP2321312.6.

(Continued)

*Primary Examiner* — Ghassem Alie
(74) *Attorney, Agent, or Firm* — Gordon & Jacobson, P.C.

(57) ABSTRACT

A glazing panel removal device comprising a winder unit having first and second winder spools for winding a cutting filament and a drive, for driving the winder spools. The drive means includes a single or common drive input for driving both the first and second winder spools. The drive may be a rotary input drive, and driving the rotary input in a first rotary direction may cause winding of the filament onto the first winder spool and driving the rotary input in the opposite direction causes winding of the filament onto the second winder spool.

16 Claims, 8 Drawing Sheets

(58) Field of Classification Search
USPC ............... 30/272.1; 29/426.4, 4, 559, 402.3; 292/70; 156/344, 94, 98, 584
See application file for complete search history.

(56) References Cited

U.S. PATENT DOCUMENTS

| | | | | |
|---|---|---|---|---|
| 4,371,058 | A * | 2/1983 | Holley ...................... | F03G 1/00 60/407 |
| 4,693,372 | A | 9/1987 | O'Neill | |
| 5,597,397 | A | 1/1997 | Funk et al. | |
| 5,610,677 | A | 3/1997 | Katagiri | |
| 5,671,457 | A | 9/1997 | Yokoyama | |
| 6,558,493 | B1 | 5/2003 | Ledger et al. | |
| 7,243,475 | B1 | 7/2007 | Cady | |
| 7,665,502 | B2 | 2/2010 | Dekker | |
| 11,161,267 | B2 | 11/2021 | Finck | |
| 2001/0011002 | A1 | 8/2001 | Steere, III | |
| 2006/0185357 | A1 | 8/2006 | Kovacevich | |
| 2007/0000361 | A1 | 1/2007 | Ericson | |
| 2008/0012349 | A1 | 1/2008 | Finck | |
| 2013/0037648 | A1 | 4/2013 | Finck | |
| 2013/0327193 | A1 | 12/2013 | Davies | |
| 2017/0100849 | A1 | 4/2017 | Finck | |

FOREIGN PATENT DOCUMENTS

| | | | |
|---|---|---|---|
| CH | 702761 | A2 | 8/2011 |
| CN | 202763877 | U | 3/2013 |
| DE | 202013105337 | U1 | 12/2013 |
| EP | 1933002 | A2 | 6/2008 |
| GB | 2354032 | A | 3/2001 |
| GB | 2465847 | A | 6/2010 |
| GB | 2508822 | A | 6/2014 |
| GB | 2511108 | A | 8/2014 |
| JP | 2000141365 | A | 5/2000 |
| JP | 2005254373 | A | 9/2005 |
| KR | 20120064311 | A | 6/2012 |
| WO | WO00/09302 | A1 | 2/2000 |
| WO | WO2004/103748 | A1 | 12/2004 |
| WO | WO2006/030212 | A1 | 3/2006 |
| WO | WO2010/067046 | A1 | 6/2010 |
| WO | WO2012/069804 | A1 | 5/2012 |
| WO | 2012/121631 | A1 | 9/2012 |
| WO | 2015/039703 | A1 | 3/2015 |
| WO | 2015/177201 | A1 | 11/2015 |

OTHER PUBLICATIONS

Chilean Office Action of application No. 201602949 dated Nov. 18, 2016.
International Search Report of Application No. PCT/EP2015/061093 dated Aug. 10, 2015.
PCT Written Opinion of Application No. PCT/EP2015/061093 dated Nov. 26, 2015.
Search Reports of Application No. GB1408938.7 dated Nov. 24, 2014 and Jan. 22, 2015.
Carglass, Feb. 19, 2014, "Ezi Wire—Cut out", vimeo.com, [online], Available from: http://vimeo.com/87093349 [Accessed Nov. 11, 2014] See video.
Carglass Italia, Jun. 26, 2012, "EZI Wire", youtube.com, [online], Available from https://www.youtube.com/watch?v=mBZOzil ShDU [Accessed Nov. 11, 2014] See video.
AE Exam Report dated Sep. 15, 2022 of Application No. P1200/2016.
CA Office Action 1 and Search Report 1 dated Jun. 10, 2021 of Application No. 2,948,578.
CA Office Action 2 and Search Report 2 dated Jan. 21, 2022 of Application No. 2,948,578.
CA Office Action dated Feb. 22, 2023 of Application No. 3,134,218.
CN Office Action 1 dated Sep. 28, 2020 of Application No. 2019109401452.
CN Office Action 2 dated Jun. 23, 2021 of Application No. 2019109401452.
EP Office Action dated Feb. 9, 2023 of Application No. 15 726 885.5-1103.
GB Exam Report dated Aug. 3, 2021 of Application No. GB2101414.7.
MX Office Action 1 dated Jul. 19, 2021 of Application No. MX/a/2016/015230.
MX Office Action 2 dated Mar. 7, 2022 of Application No. MX/a/2016/015230.
MX Office Action 2 dated May 25, 2023 of Application No. MX/a/2021/015103.
MX Office Action dated Jan. 19, 2023 of Application No. MX/2023/7963.
NZ Exam Report dated May 31, 2021 of Application No. 725858.
NZ Exam Report dated May 31, 2021 of Application No. 761723.
NZ Exam Report dated Jul. 14, 2021 of Application No. 764504.
NZ Exam Report dated Feb. 10, 2022 of Application No. 764504.
UA Office Action dated Jan. 25, 2022 of Application No. a 2021 05809.
UA Office Action dated Mar. 16, 2022 of Application No. a 2021 05809.

* cited by examiner

GLAZING PANEL REMOVAL

CROSS-REFERENCE TO RELATED APPLICATIONS

This application is a continuation of U.S. patent application Ser. No. 17/505,551, filed Oct. 19, 2021, which is a continuation of U.S. patent application Ser. No. 15/312,218, filed on Nov. 18, 2016, now U.S. Pat. No. 11,161,267, which is the national stage of International Patent Application No. PCT/EP2015/061093, filed on May 20, 2015, which claims priority from British Patent Application No. GB 1408938.7, filed on May 20, 2014, all of which are hereby incorporated herein by reference in their entireties.

BACKGROUND

1. Field

This invention relates generally to glazing panel removal and more particularly to glazing panel removal techniques using a cutting wire or other length of cutting filament to remove vehicle glazing panels.

2. State of the Art

Glazing panel removal techniques are known using wire winding tools. Such an arrangement is shown in for example WO2006/030212 which discloses winder unit having a pair of winder spools and guide pulleys mounted outwardly of the winder spools. More recently techniques have been developed which use synthetic plastics fibre line in place of wire.

An improved tool for use in such cutting techniques has now been devised.

SUMMARY

According to a first aspect, the present invention provides a glazing panel removal device comprising a winder unit having:

- first and second winder spools for winding a cutting filament;
- drive means for driving the winder spools;
- wherein the drive means comprises a single or common drive input for driving both the first and second winder spools.

In one embodiment the drive means comprises a rotary input drive means, preferably arranged such that driving the rotary input in a first rotary direction causes winding of the filament onto the first winder spool and driving the rotary input in the opposite direction causes winding of the filament onto the second winder spool.

In certain embodiments, it is preferred that the drive means is arranged to be configured to either:

- i) drive the winder spools simultaneously or
- ii) drive one of the winder spools, whilst permitting the other to rotate without being driven.

The drive means is arranged to be configured to drive the winder spool or spools such that the filament is wound onto one spool whilst being wound simultaneously off the other.

It is preferred that the drive means is arranged to be configured between a configuration in which filament is permitted to be wound off one of the spools and a configuration in which the filament is prevented from winding off that same spool.

This may be achieved for example by means of using a brake arrangement, which may be an adjustable brake arrangement arranged to vary the torque required to wind the filament off either of the winder spools. With the brake fully applied the winding off torque is so high that the filament is prevented from being wound off. With the brake partially applied the winding off torque is less and the filament can be wound off if the required torque is applied. This enables the torque for slip cutting to be adjusted.

In one embodiment the drive means may comprise an input drive shaft comprising the drive input and separate transmission shafts transmitting rotary motion to drive respective winder spools, the transmission shafts extending transversely to the input drive shaft.

In a preferred embodiment the device may include a transmission comprising a common bevel gear arrangement for transmitting rotary motion to each of the winder spools.

In a preferred embodiment the device may include a transmission comprising respective one way bearings for transmitting rotary motion to each of the winder spools. A one way bearing is known in the art as a device that permits transmission of torque for rotation in a first direction but not for rotation in the opposed direction.

In a preferred embodiment one or more preferably both of the rotary winder spools are demountable from the unit.

In a preferred embodiment one or more preferably both of the winder spools are arranged to be mounted with respect to a driven shaft in an engaged position in which the spool is coupled to rotate with the driven shaft and a neutral position in which the spool can rotate independently of the driven shaft.

It is preferred that the winder spools are mounted to rotate on axes that are substantially co-axial with one another.

It is preferred that the device further comprises mounting means for mounting the device to a glazing panel. In a preferred embodiment the mounting means comprises one or more suction devices.

It is preferred that the device comprises one or more guide pulleys spaced from the winder spools.

The drive means may be configured to be manually driven (using a lever coupled with a drive shaft) or power driven. Beneficially the device is capable of being either manually driven or power driven. It is therefore preferably capable of coupling with a manual drive tool or a powered drive tool.

According to a further aspect, the invention provides a glazing panel removal device comprising a winder unit having:

- mounting means for mounting the device on the glazing panel;
- first and second winder spools for winding a cutting filament;
- wherein the rotational axes of the first and second winder spools are substantially:
  - i) coaxial; and/or
  - ii) horizontal or parallel with respect to the general plane of the vehicle glazing panel when the device is mounted.

According to a further aspect, the invention provides a glazing panel removal device comprising a winder unit having:

- first and second winder spools for winding a cutting filament;
- drive transmission for driving the wider spools;
- wherein the drive transmission is arranged to drive one of the winder spools, whilst permitting the other to rotate without being driven.

It is preferred that the transmission is arranged to be switched so as to permit the other of the spools to be driven whilst the remaining spool rotates without being driven. The switching may be achieved by means of rotating a common drive gear in opposed directions.

According to a further aspect, the invention provides a glazing panel removal device comprising a winder unit having at least one winder spool for winding a cutting filament, wherein the winder spool is arranged to be mounted with respect to a driven shaft in an engaged position in which the spool is coupled to rotate with the driven shaft and a neutral position in which the spool can rotate independently of the driven shaft.

According to a further aspect, the invention provides a glazing panel removal device comprising a winder unit having at least one winder spool for winding a cutting filament, wherein the winder spool is arranged to be mounted or coupled with respect to a driven shaft by magnetic means.

Preferred aspects presented in respect of the first aspect of the invention may, it will readily be appreciated, also be preferred in relation to the other aspects defined.

These and other aspects of the present invention will be apparent from and elucidated with reference to, the embodiment described herein.

An embodiment of the present invention will now be described, by way of example, and with reference to the accompanying drawings.

DETAILED DESCRIPTION

Figure 1:
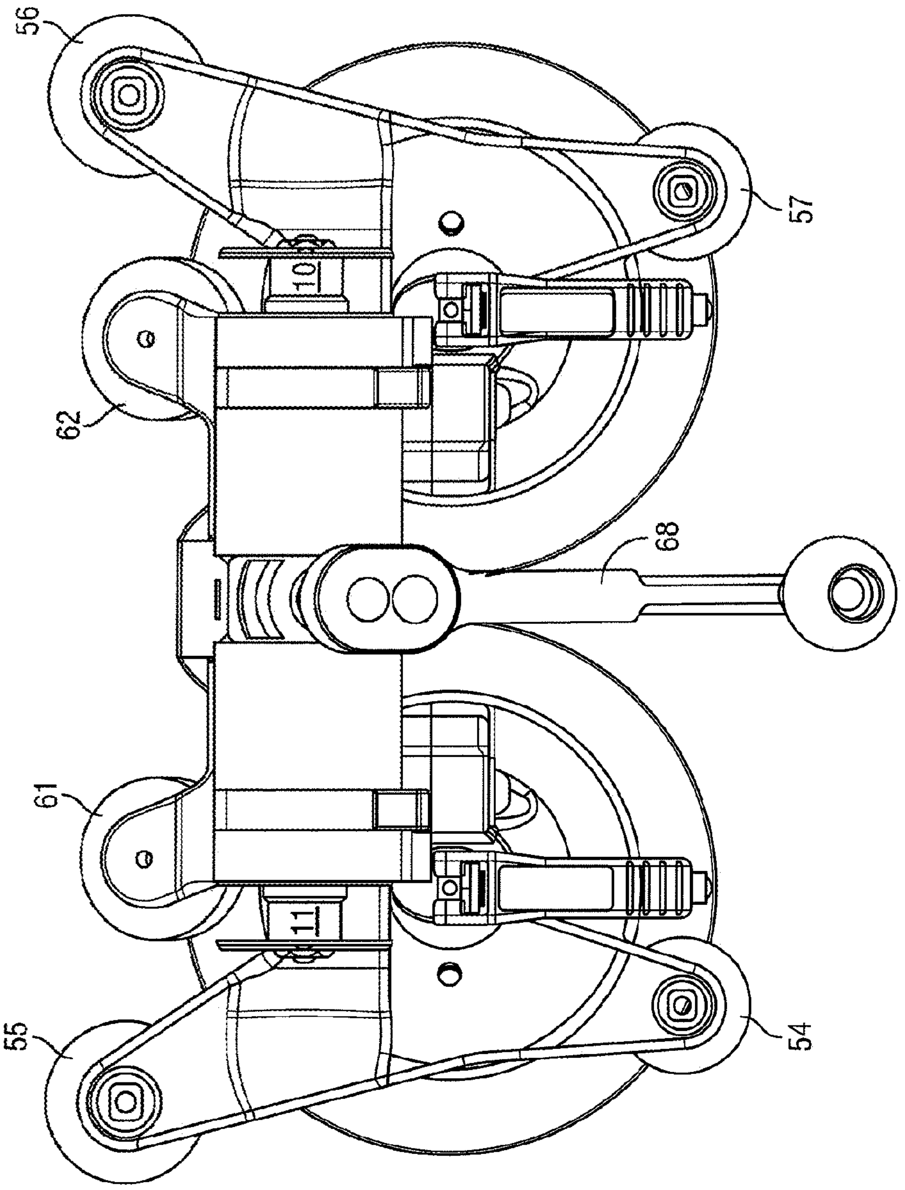
FIG. 1 is a plan view of an exemplary embodiment of winder unit in accordance with the invention.
Figure 2:
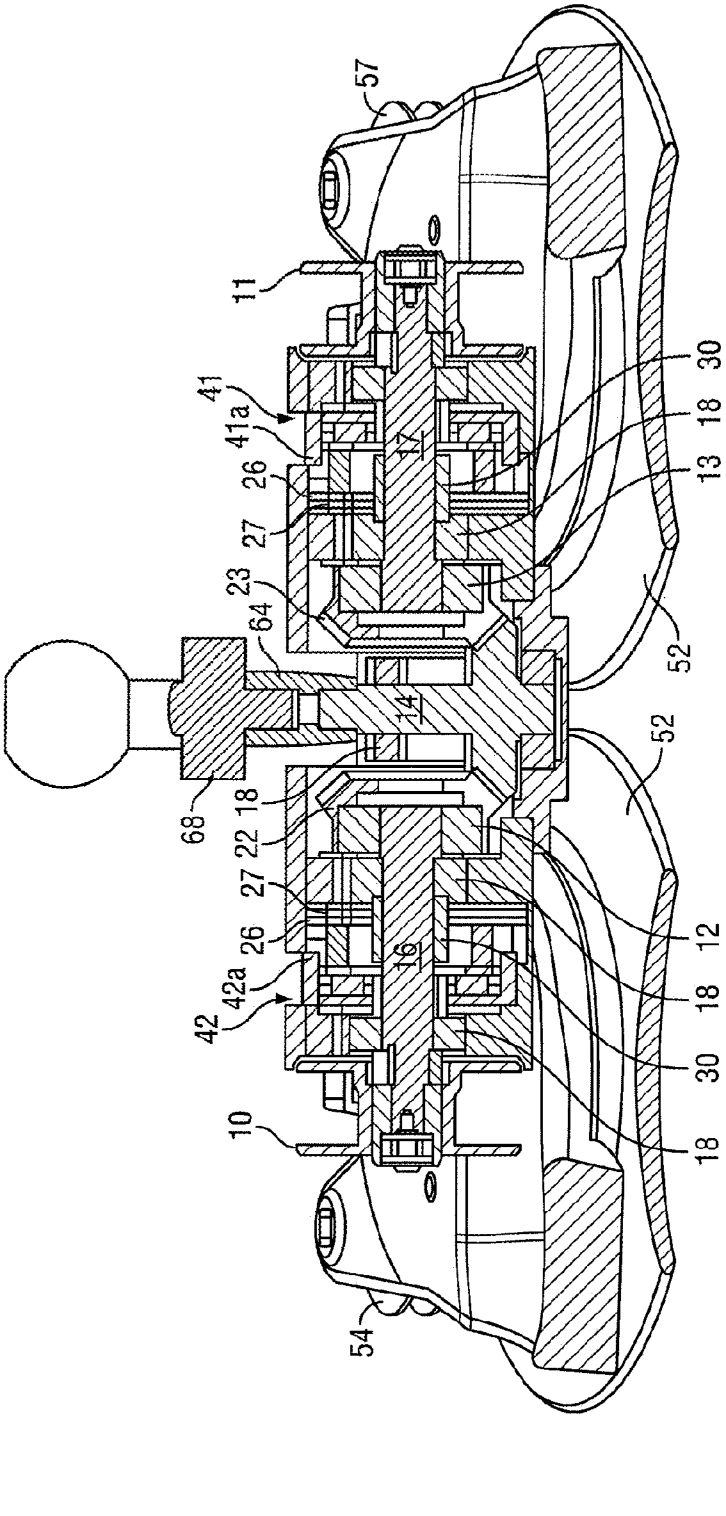
FIG. 2 is a sectional view of the winder unit of FIG. 1.
Figure 3:
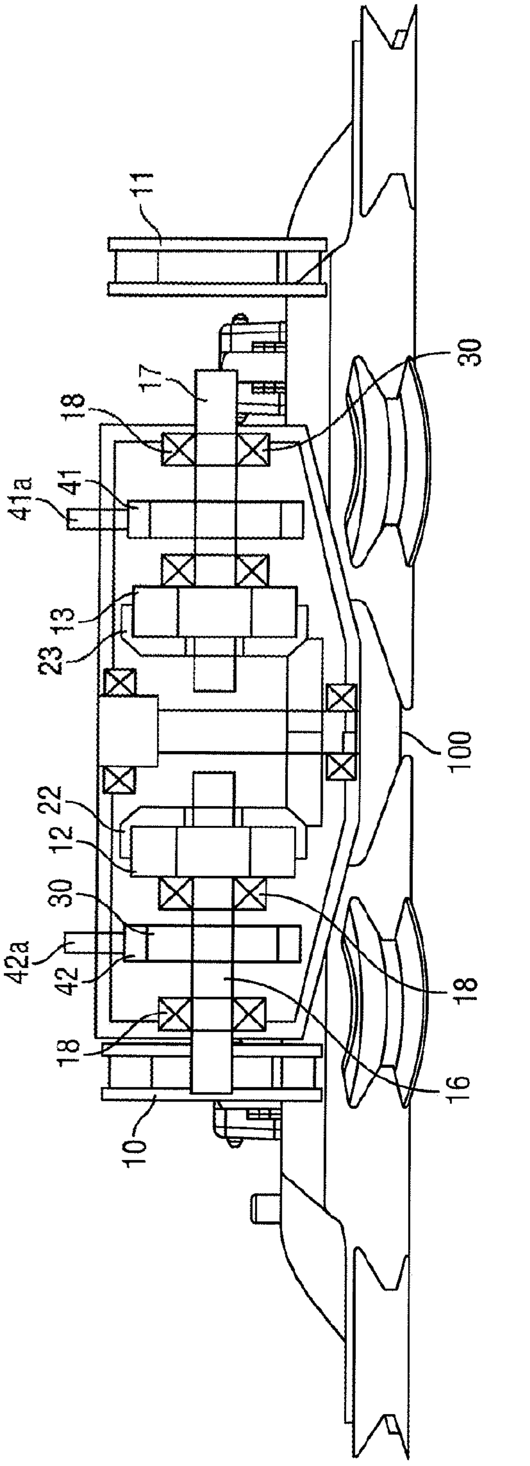
FIG. 3 is a schematic view of an exemplary winder unit according to the invention.
Figure 7:
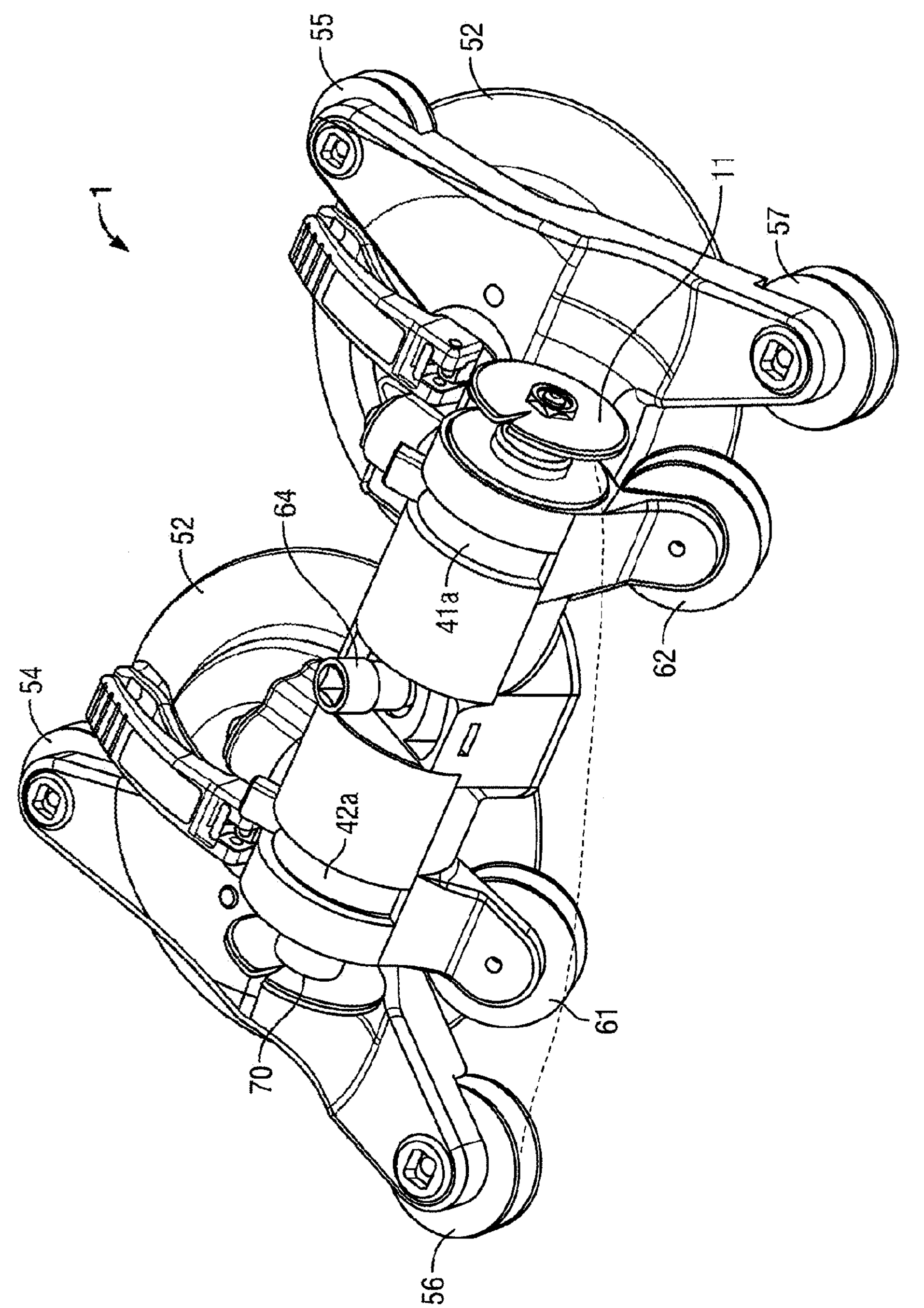
FIG. 7 is a perspective view of the embodiment of FIGS. 1 and 2.

Referring initially to FIGS. 1, 2 and 7 in particular, there is shown a glazing panel removal device 1 in the form of a winder unit 1 to be mounted on a vehicle glazing panel, and in a first mode of operation being capable of being used with a cut out wire in a similar manner to the unit disclosed in WO2006/030212. In an alternative mode of operation the unit can be used in combination with a plastics fibre line filament in place of a cutting wire.

The unit is similar in certain respects to the winder unit disclosed in WO2006/030212, particularly in that it utilises a pair of spaced suction mounts 52 and also a pair of spaced winder spools 10, 11 for winding the cutting filament in the worm either of the cutting wire or the cutting plastics fibre line. The unit also includes rotatable guide pulleys 54, 55, 56, 57 for guiding the cutting filament 100 which are arranged in similar configuration to the arrangement of FIG. 12 in WO2006/030212.

The unit includes further 2 inclined or angled pulleys 61, 62 which are provided to guide the filament 100 as it is wound onto and off a respective winder spool 10, 11. These pulleys are provided because, contrary to the arrangement of WO2006/030212, the winder spools 10, 11 are arranged upright, coaxially with one another and with their rotational axis horizontal (i.e. parallel to the general plane of the glazing panel to which the unit is mounted). This for ergonomic and ease of use reasons, particularly because the winder spools are demountable from their respective drive shafts 16, 17 and the arrangement in this configuration makes for easy mounting and de-mounting.

A further departure from the arrangement shown in WO2006/030212 is that a single drive for driving both the winder spools 10, 11 is provided. The single drive comprises a socket 64 coupled to a drive shaft 14. In one embodiment a rotary manual handle 68 can be coupled to drive the drive shaft 14 via the socket 64. In an alternative embodiment a powered drive tool can be coupled to the drive socket 64. The transmission system for driving the spools 10, 11 will be described in detail below.

As shown in FIG. 2 the transmission for rotating the winder spools 10, 11 comprises a vertically orientated input drive shaft 14 to which is mounted a mitre gear 15. The mitre gear 15 drives a respective drive gear 22, 23 for a respective spool drive shaft 16, 17 to which the spools are mounted. Shaft bearings 18 are provided for the input shaft 14 and the drive shafts 16, 17.

Importantly the gears 22, 23 act to drive the shafts 16, 17 through respective one way bearings 12, 13. These ensure that torque is only transmitted to the respective drive shafts 16, 17 when the respective gear 22, 23 is rotated in one direction (opposite rotation directions for each of the gears 22, 23). One way bearings are known in the art.

Figure 5A:
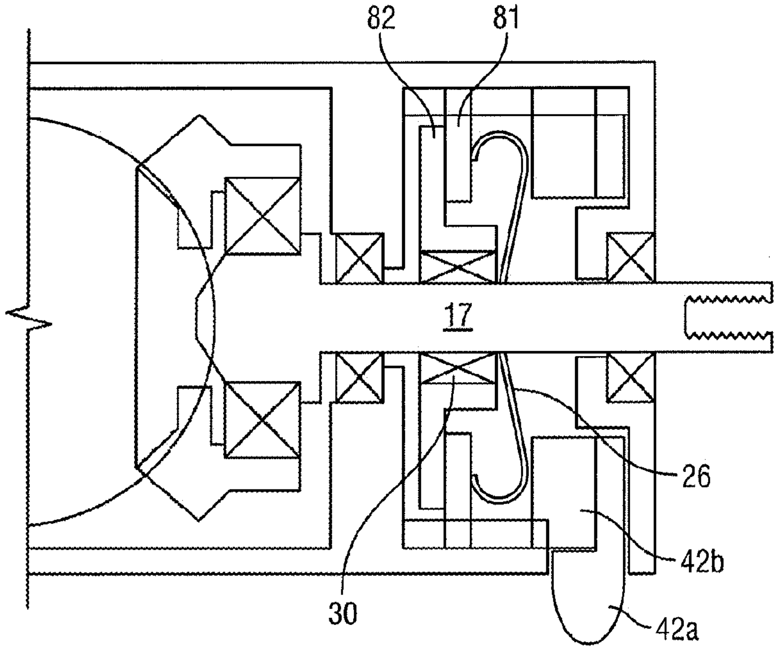
FIGS. 5A and 5B show schematically the configuration if an adjustable friction brake arrangement suitable for operating in accordance with the invention.
Figure 5B:
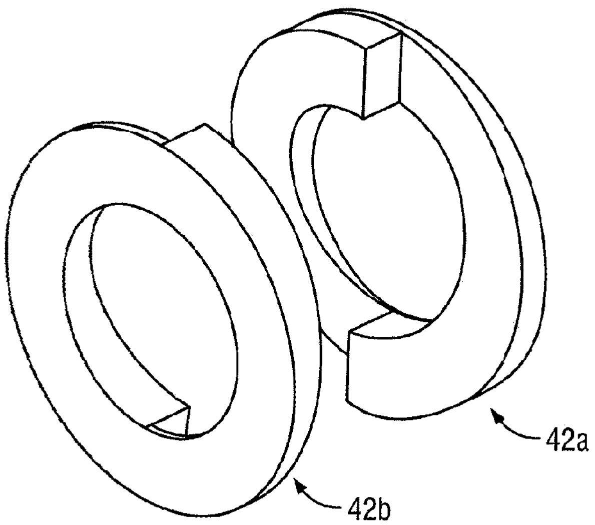

Also mounted to the respective shafts 16, 17 are respective adjustable friction brake arrangements 41, 42 which are controlled by operating a rotary control annulus 41*a*, 42*a* which is cam profiled to urge a movable brake disc 25, 26 to frictionally engage with fixed washers 27 in order to provide a braking effect. An alternative exemplary arrangement is shown in the schematic embodiment of FIGS. 5A and 5B in which a wave compression spring 26 is provided between the brake actuator 42*b* and a friction washer 81. The friction washer 81 acts against a friction plate 82 mounted by means of a one way bearing 30 to the shaft 17. The control annulus 42*a* and the brake actuator 42*b* are cam profiled such that rotation of the annulus 42*a* results in axial movement of the brake actuator 42*b*.

In the embodiment of FIGS. 1, 2 and 7 a series of fixed and rotary brake discs indicated at 27. The brake arrangement does not rotate with the shaft 16 or 17. One way bearings 30 ensure that friction is not applied by the brake to the shaft 16, 17 whilst winding in the filament on the respective spool 10, 11. The brake only takes effect for winding in the opposite direction.

In use the transmission can be used in two modes, these being slip mode (in which the filament 100 is simultaneously wound off one spool as it is wound onto another) and non-slip mode (in which the filament is wound onto one of the spools whilst not being wound off the other). In slip mode the tension can be adjusted using the brake devices.

Figure 4A:
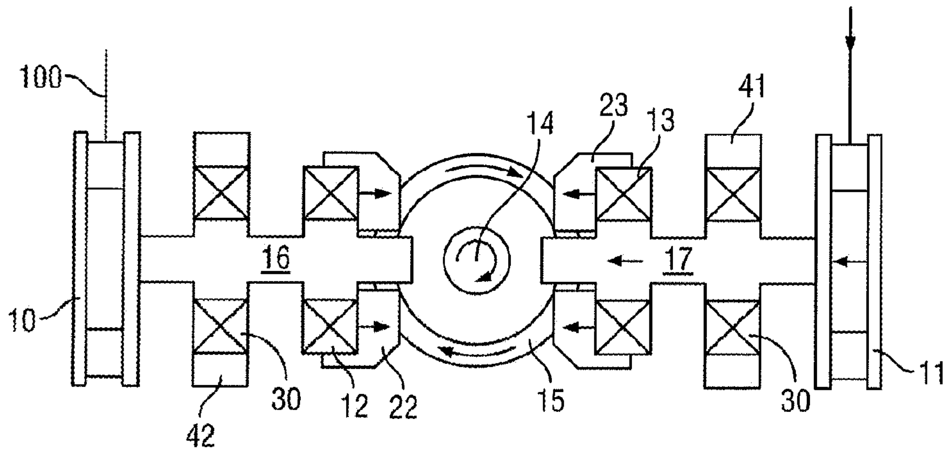
FIGS. 4A to 4E are schematic representations showing operation of the transmission/drive train of a unit in accordance with the invention.
Figure 4B:
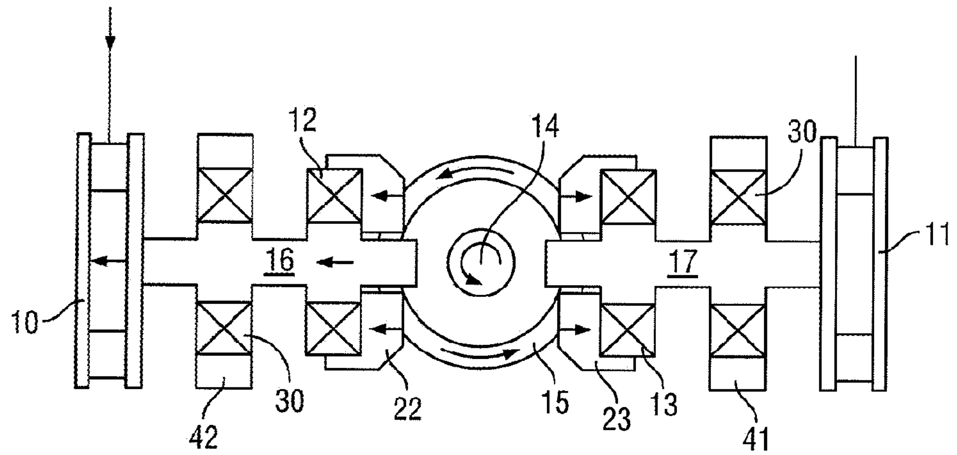
Figure 4C:
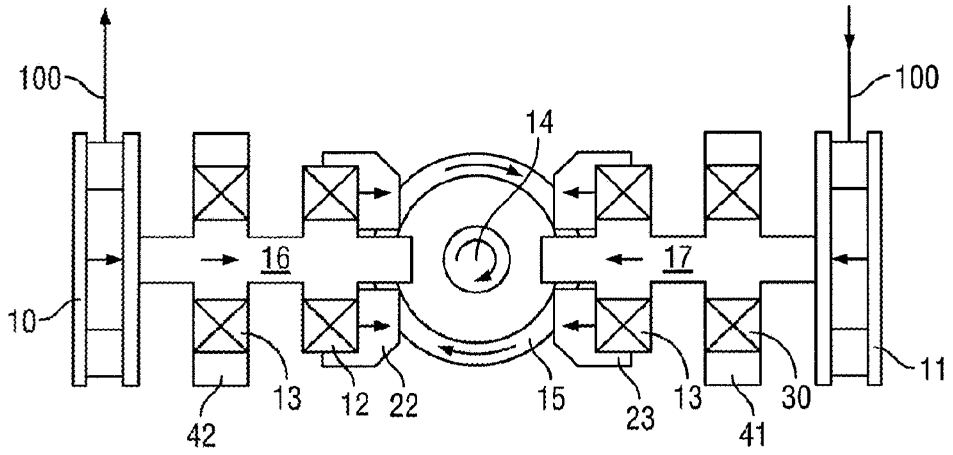
Figure 4D:
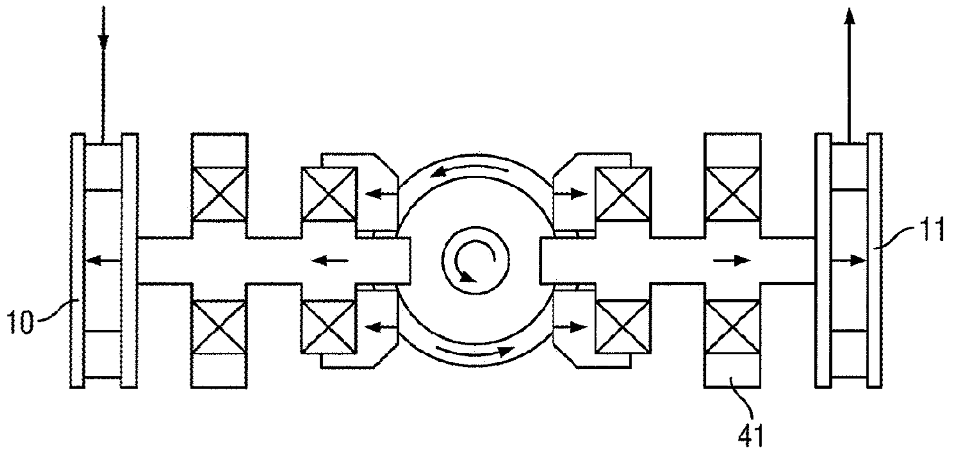
Figure 4E:
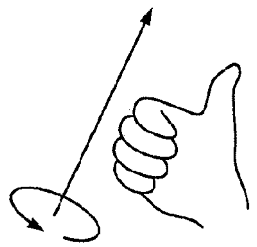

Non-slip mode is shown in FIGS. 4A and 4B where the arrows show the rotation according to the right hand rule FIG. 4E. In FIG. 4A rotation of the drive shaft 14 and mitre gear 15 is clockwise. Torque is transferred via the one way bearing 13 to rotate the shaft 17 and spool 11 to wind in the filament 33. The one way bearing 30 on the brake device 41 is configured such that when the shaft 17 is driven, no brake is applied by brake 41.

In the situation of FIG. 4A the brake 42 is fully applied and effective by means of torque being applied via the one way bearing 30 of brake 42 so as to apply braking friction to the shaft 16 to a degree sufficient to prevent rotation. Torque is not applied through the one way bearing 12 of gear 22 to drive the shaft 16. Consequently filament is not wound off spool 10 because the tension in the filament 100 is not sufficient to overcome the braking force of the brake 42.

For counter-clockwise winding of the drive shaft 14, the situation is reversed as shown in FIG. 4B and filament is wound onto spool 10 but not off spool 11. In this configuration torque is not transferred through bearing 30 of brake 42. Torque is however applied via the bearing 30 of brake 41. The transmission is driving the shaft 16 because torque is applied via the bearing 12. No torque is applied via the bearing 13.

This non-slip cutting is achieved when the brakes 41, 42 are full applied (or at least sufficiently applied to prevent rotation as a result of tension in the filament).

If the brakes 41, 42 are not fully applied, then the slip cutting situation shown in FIGS. 4C and 4D results. The braking force applied by the brakes 41, 42 (when acting via the respective one way bearings 30) is not sufficient to prevent the tension in the filament on the winding off spool causing rotation of the spool 10, 11 and slip cutting occurs as filament is wound off one spool whilst being simultaneously wound onto the other. In the clockwise drive shaft 14 rotation situation shown in FIG. 4C the shaft 17 is driven via the one way bearing 13 and the brake 41 torque is not being applied via the one way bearing 30. The one way bearing 30 of brake 42 is acting to transmit braking torque, but not sufficient to prevent the filament 100 from being wound off the spool 10. One way bearing 12 of gear 22 is not acting.

In the situation of counter-clockwise rotation (as shown in FIG. 4D, the operation is reversed). Shaft 16 is driven by the active bearing 12 in order to wind on to spool 10. Shaft 17 rotates due to the torque applied via the filament 100 being wound off spool 11. Brake 41 is active but not sufficient to prevent the filament being wound off spool 11. Because the brake torque is adjustable, the tension in the filament required to effect winding off the relevant spool can be adjusted. This provides for adjustable slip cutting.

As an alternative to the transmission described, the gear train could be used to drive the shafts simultaneously in opposed directions but this would result in potentially a less versatile means of operation as the alternative modes of cutting would be more difficult to achieve.

Figure 6A:
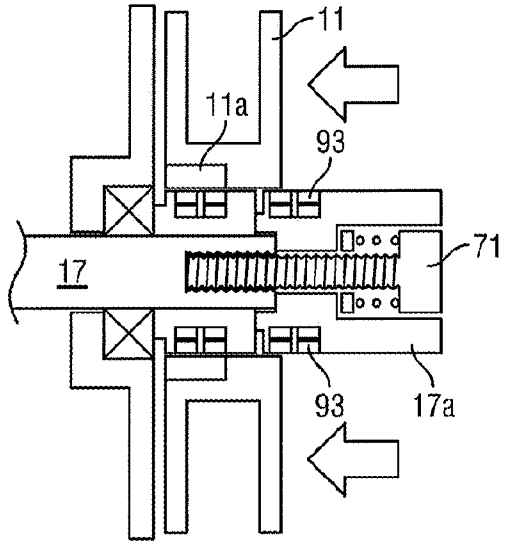
FIGS. 6A and 6B show how the winder spools are mounted to the transmission shaft in accordance with an aspect of the invention.
Figure 6B:
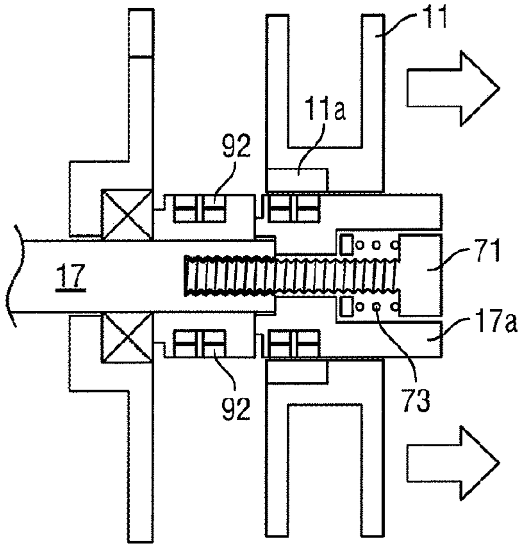

The spools 10, 11 are mounted on respective drive shafts in 16, 17 in two positions, a driving or engaged position in which they rotate with the driven shaft 16, 17 and a neutral position in which they can rotate independently of the main drive shaft 16, 17. The spools 10, 11 are displaced axially outwardly from the drive position to the neutral position. In the neutral position the spools 10, 11 are held to rotate with a rotatable shaft tip 16*a*, 17*a* which is rotatably fixed to the main shaft 16, 17 by a respective axis pin 71. This is shown most clearly and schematically in FIGS. 6A and 6B. FIG. 6A shows the spool 11 in the engaged position. FIG. 6B shows the spool 11 in the neutral position. The shaft tip 71 and the shaft are provided with magnets 92, 93 and the spool has a ferrite insert 11*a* to ensure that the spool is held in the desired engaged or neutral position. A spring 73 is provided to control friction in the rotating tip 16*a*, 17*a*.

The ability to engage neutral position is important to enable filament to be pulled off from the spools once it has already been wound on. This is necessary for example when using the fibre line filament during the set up procedure.

The cut out unit can be used in various techniques and procedures and is particularly versatile in this regard being capable for powered or manual use and also for use with traditional wire or the newer fibre line filament.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. A unitary device for removing a vehicle glazing panel, the unitary device comprising:

at least one mount integral to the unitary device and configured to mount the device to a vehicle glazing panel;

first and second winder spools integral to the unitary device and configured to wind a cutting filament used to remove the vehicle glazing panel;

a first set of guide pulleys integral to the unitary device and disposed at positions offset from the first winder spool;

a first inclined pulley integral to the unitary device and disposed at a position offset from the first winder spool at an inclined angle relative to the first set of guide pulleys;

a second set of guide pulleys integral to the unitary device and disposed at positions offset from the second winder spool;

a second inclined pulley integral to the unitary device and disposed at a position offset from the second winder spool at an inclined angle relative to the second set of guide pulleys;

a single input drive shaft integral to the unitary device and configured to drive for driving both the first and second winder spools; and a transmission integral to the unitary device and configured to operably couple the single input drive shaft to first and second transmission shafts, wherein the first transmission shaft is configured to drive rotary motion of the first winder spool, and wherein the second transmission shaft is configured to drive rotary motion of the second winder spool.

2. A unitary device according to claim 1, wherein:

the transmission is configured to convert rotary input of the single input drive shaft in a first rotary direction to rotary motion of the first winder spool in order to wind the filament onto the first winder spool and to convert rotary input of the single input drive shaft in a second rotary direction opposite the first rotary direction to rotary motion of the second winder spool in order to wind the filament onto the second winder spool.

3. A unitary device according to claim 1, wherein:

the transmission is configured to drive one of the first and second winder spools, whilst permitting the other of the first and second winder spools to rotate without being driven.

4. A unitary device according to claim 3, wherein:

the transmission is further configured to drive the first and second winder spools such that the filament is wound onto one of the first and second winder spool whilst being wound simultaneously off the other of the first and second winder spools.

5. A unitary device according to claim 1, wherein:

the transmission is configured such that the filament is prevented from winding off one of the first and second winder spools whilst being wound on to the other of the first and second winder spools.

6. A unitary device according to claim 1, further comprising:

an adjustable brake arrangement integral to the unitary device and arranged to vary the torque required to wind the filament off either of the first and second winder spools.

7. A unitary device according to claim 1, wherein:

the first and second transmission shafts extend transversely relative to the input drive shaft.

8. A unitary device according to claim 1, wherein:

the transmission comprises a common bevel gear arrangement for transmitting rotary motion to each of the first and second winder spools.

9. A unitary device according to claim 1, wherein:

the transmission comprises respective one-way bearings for transmitting rotary motion to each of the first and second winder spools.

10. A unitary device according to claim 1, wherein:

one or both of the first and second rotary winder spools are demountable from the first and second transmission shafts that drive rotation of the first and second winder spools, respectively.

11. A unitary device according to claim 1, wherein:

one or both of the first and second winder spools are arranged to be selectively mounted to the respective first and second transmission shafts in an engaged position in which the winder spool rotates with the corresponding first or second transmission shaft and a neutral position in which the winder spool rotates independently of the corresponding first or second transmission shaft.

12. A unitary device according to claim 1, wherein:

the first and second winder spools rotate on axes that are substantially co-axial with one another.

13. A unitary vehicle glazing panel removal device according to claim 1, wherein:

the at least one mount comprises one or more suction mounts.

14. A unitary device according claim 1, further comprising:

a socket integral to the device and coupled the single input drive shaft, wherein the socket is configured to couple to at least one tool for imparting rotary input to the single input drive shaft to wind the cutting filament using the first and second winder spools to remove the vehicle glazing panel.

15. A unitary device according claim 14, wherein:

the at least one tool comprises a powered drive tool.

16. A unitary device according claim 14, wherein:

the at least one tool comprises a manual drive tool.

* * * * *